(12) United States Patent
Adams et al.

(10) Patent No.: US 7,690,579 B2
(45) Date of Patent: Apr. 6, 2010

(54) ANSWER TO RESET (ATR) PUSHING

(75) Inventors: Neil Adams, Waterloo (CA); Herbert Little, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 173 days.

(21) Appl. No.: 11/457,159

(22) Filed: Jul. 13, 2006

(65) Prior Publication Data

US 2008/0011851 A1 Jan. 17, 2008

(51) Int. Cl.
*G06K 19/06* (2006.01)
(52) U.S. Cl. .................. 235/492; 235/380; 235/382; 235/451
(58) Field of Classification Search ............ 235/492, 235/380, 441, 382, 382.5, 451, 487, 375
See application file for complete search history.

(56) References Cited

U.S. PATENT DOCUMENTS

| | | | | |
|---|---|---|---|---|
| 5,929,414 | A * | 7/1999 | Saitoh | 235/380 |
| 6,578,768 | B1 * | 6/2003 | Binder et al. | 235/492 |
| 6,732,925 | B1 * | 5/2004 | Takayasu | 235/451 |
| 6,769,609 | B2 * | 8/2004 | Ono et al. | 235/380 |
| 2003/0183691 | A1 | 10/2003 | Lahteenmaki et al. | |
| 2004/0065734 | A1 * | 4/2004 | Piikivi | 235/451 |
| 2004/0256470 | A1 * | 12/2004 | Takami et al. | 235/492 |
| 2005/0045720 | A1 * | 3/2005 | Fruhauf | 235/440 |
| 2006/0095598 | A1 * | 5/2006 | Prevost et al. | 710/10 |
| 2006/0131413 | A1 * | 6/2006 | Morita | 235/451 |
| 2007/0164118 | A1 * | 7/2007 | Degauque et al. | 235/492 |
| 2007/0200003 | A1 * | 8/2007 | Deprun et al. | 235/492 |
| 2007/0228154 | A1 * | 10/2007 | Tran | 235/380 |

OTHER PUBLICATIONS

"ST7SCR", 8-Bit Low-Power, Full-Speed USB MCU with 16K Flash, 768 RAM Smartcard I/F, Timer. www.st.com Apr. 2007, 1-66.
Koegler, Lutz, Extended European Search Report for EP 06117102.1, Mar. 6, 2007.
Lutz, Koegler, Extended European Search Report for EP 08158116.7, Oct. 31, 2008.
Tao, Liang, First Office Action with translation for CN 200710128731.4, Jul. 25, 2008.
Atmel Corporation, , "Requirements of ISO/IEC 14443 Type B Proximity Contactless Identification Cards—Application Note", Atmel Corporation, "Requirements of ISO/IEC 14443 Type B Proximity Contactless Identification Cards—Application Note", Rev. 2056B-RFID-11/05, Nov. 2005.

* cited by examiner

*Primary Examiner*—Edwyn Labaze
(74) *Attorney, Agent, or Firm*—Integral Intellectual Property Inc.; Miriam Paton (57) ABSTRACT

A wireless-enabled smart card reader receives an Answer to Reset (ATR) from a smart card and transmits the ATR using a wireless communication link to a computing device without waiting for an ATR request from the computing device. The computing device may cache the ATR and use it for subsequent communication sessions with the smart card.

5 Claims, 6 Drawing Sheets

ANSWER TO RESET (ATR) PUSHING

BACKGROUND

Smart cards are personalized security devices, defined by the ISO 7816 standard and its derivatives, as published by the International Standards Organization. A smart card may have a form factor of a credit card and may include a semiconductor device. The semiconductor device may include a memory that can be programmed with security information (e.g. a private decryption key, a private signing key, biometrics, an authentication certificate, etc.), and may include a decryption engine, e.g. a processor and/or dedicated logic, for example, dedicated decryption logic and/or dedicated signing logic. A smart card may include a connector for powering the semiconductor device and performing serial communication with an external device. A smart card may be used for visual identification, time cards, door access, and the like.

Part 3 of the ISO 7816 describes electronic signals and transmission protocols for smart cards. In this part of the standard, the format for an Answer to Reset (ATR) is defined. Every smart card is required to give an answer when it is reset by a smart card reader. A reset occurs when the smart card is powered up by a reader, usually when the smart card is inserted; however, the smart card reader has the capability to cause a smart card reset at any time. The ATR contains information about the smart card's capabilities, such as the bit rates that it can support, enabling the smart card reader to communicate further with the smart card. In addition, it may also contain information about the smart card manufacturer, and other hardware characteristics of the integrated circuit or the memory on the smart card.

A smart card reader may communicate with a computing device, such as a personal computer (PC) or a mobile communications device, to provide authentication for an intended user of the computing device. The user inserts his or her smart card into the smart card reader, and enters a secret, for example a personal identification number (PIN), to verify that he or she is the owner of the smart card. Once verified as a legitimate user, the PC will allow the user to log onto their account. The smart card may then be used to decrypt received messages, or to attach a digital signature to a message sent from the computing device. The smart card may also be used for user authentication, to verify a signature, and to encrypt outgoing messages. To use the smart card for such tasks, the computing device communicates instructions to the smart card reader, which the smart card reader then communicates to the smart card. The smart card reader waits for the smart card's response to each instruction, and then communicates these responses back to the computing device. However, before any communications between the computing device and the smart card can begin, the smart card driver on the computing device requires information about the communication protocols and data transmission rates that are supported by the smart card. To obtain this information, the smart card driver on the computing device will usually send a request for the ATR to the smart card reader at the start of a communication session with the smart card.

If sent over a direct or wired connection, a request for ATR and the returned ATR may be transmitted very efficiently. The smart card reader and smart card are able to communicate when in direct physical contact with each other—the smart card has contacts and the smart card reader has a connector. Alternatively, for contactless smart cards, the smart card reader and the smart card are able to communicate when proximate using radio frequency signals. Depending on the design and implementation, the smart card reader and the computing device are able to communicate via a serial port, parallel port, universal serial bus (USB) port, or other direct or wired link.

Smart card readers may communicate with a computing device either via a wired connection, or via a wireless communication link. Wireless communication links are much slower than wired communication links. Yet wireless devices and wireless communications are increasingly replacing wired or direct communication links to allow more flexibility in device design and use. For example, Bluetooth® wireless technology provides an easy way for a wide range of Bluetooth® devices (BT devices) to communicate with each other and connect to the Internet without the need for wires, cables and connectors. Other wireless communication protocols include ZigBee™, radio frequency identification (RFID), ultra wideband (UWB), IEEE 802.11 and various proprietary wireless communication protocols.

BRIEF DESCRIPTION OF THE DRAWINGS

Embodiments are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

Figure 1:
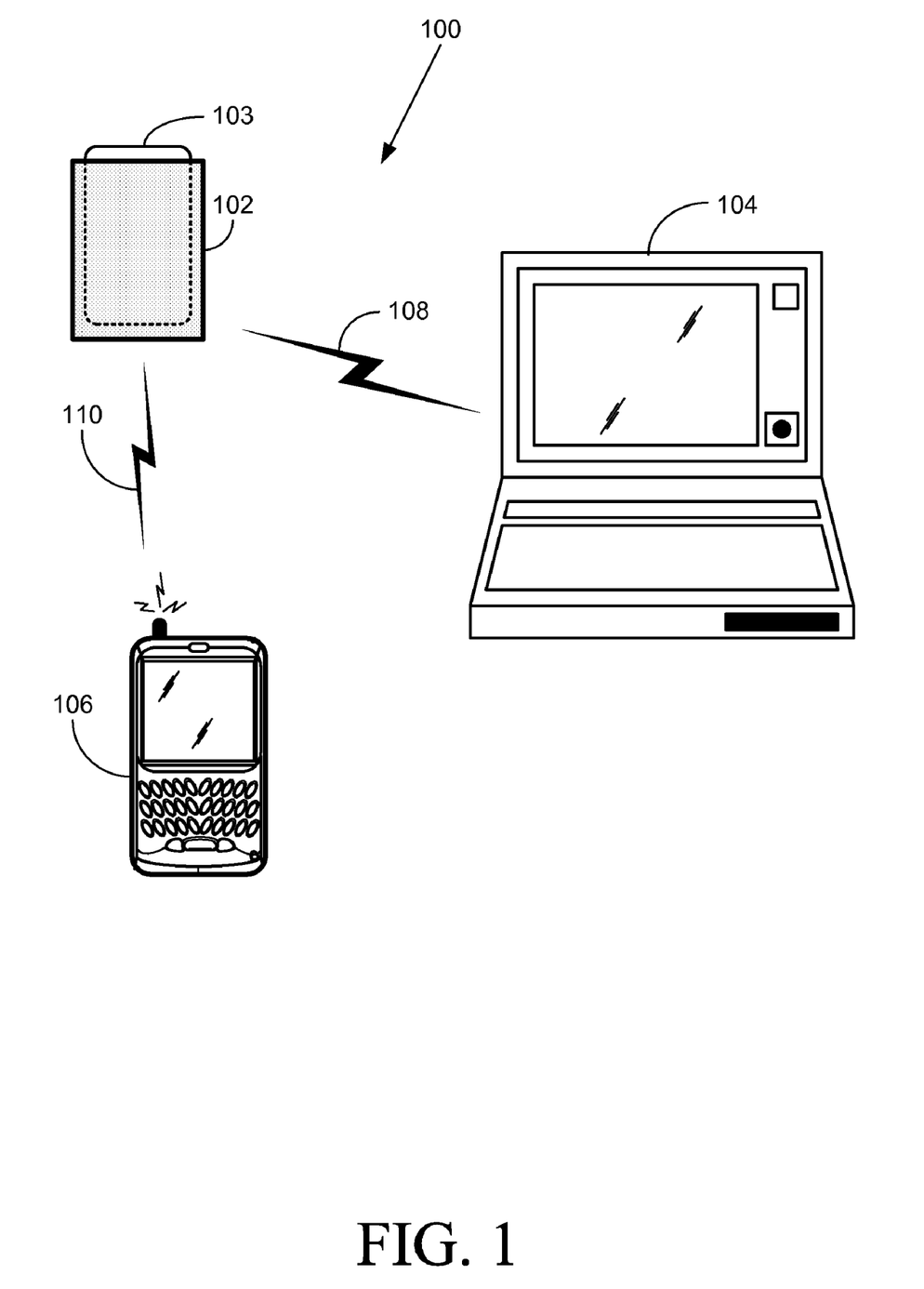
FIG. 1 is a schematic diagram of a system comprising two exemplary computing devices and a smart card reader, according to some embodiments of the invention.

FIG. 1 is a schematic diagram of an exemplary system including two computing devices that may communicate with a smart card reader, according to some embodiments of the invention. A system 100 includes a wireless-enabled smart card reader (SCR) 102, a wireless-enabled personal computer (PC) 104, and a wireless-enabled mobile device 106. A smart card (SC) 103 is shown inserted into smart card reader 102. According to ISO standard 7816, smart card reader 102 may cause smart card 103 to reset at any time. Following the reset, smart card 103 automatically sends an Answer to Reset (ATR) to smart card reader 102.

Smart card reader 102 and personal computer 104 may communicate via a wireless communication link 108, and smart card reader 102 and mobile device 106 may communicate via a wireless communication link 110. In this description and the claims, a wireless communication link may include one or more wired portions and/or one or more optical portions. As shown in FIG. 1, communication links 108 and 110 are wireless communication links, for example Bluetooth® communication links, ZigBee™ communication links, radio frequency identification (RFID) communication links, ultra wideband (UWB) communication links, IEEE 802.11 communication links and any other suitable type of wireless communication link.

The person whose security information is stored on smart card 103 may use smart card reader 102, for example, to provide personal identification from smart card 103 to personal computer 104 and/or to mobile device 106, or to digitally sign and/or decrypt e-mail messages sent by personal computer 104 and/or by mobile device 106. To accomplish any of these tasks, computing devices 104 and/or 106 may communicate with smart card 103 through smart card reader 102. For personal computer 104 or mobile device 106 to communicate with smart card 103 through smart card reader 102, they require information about smart card 103 that is contained in the ATR. Typically, personal computer 104 or mobile device 106 will request the ATR from smart card reader 102 at the start of a communication session with smart card 103.

Figure 2:
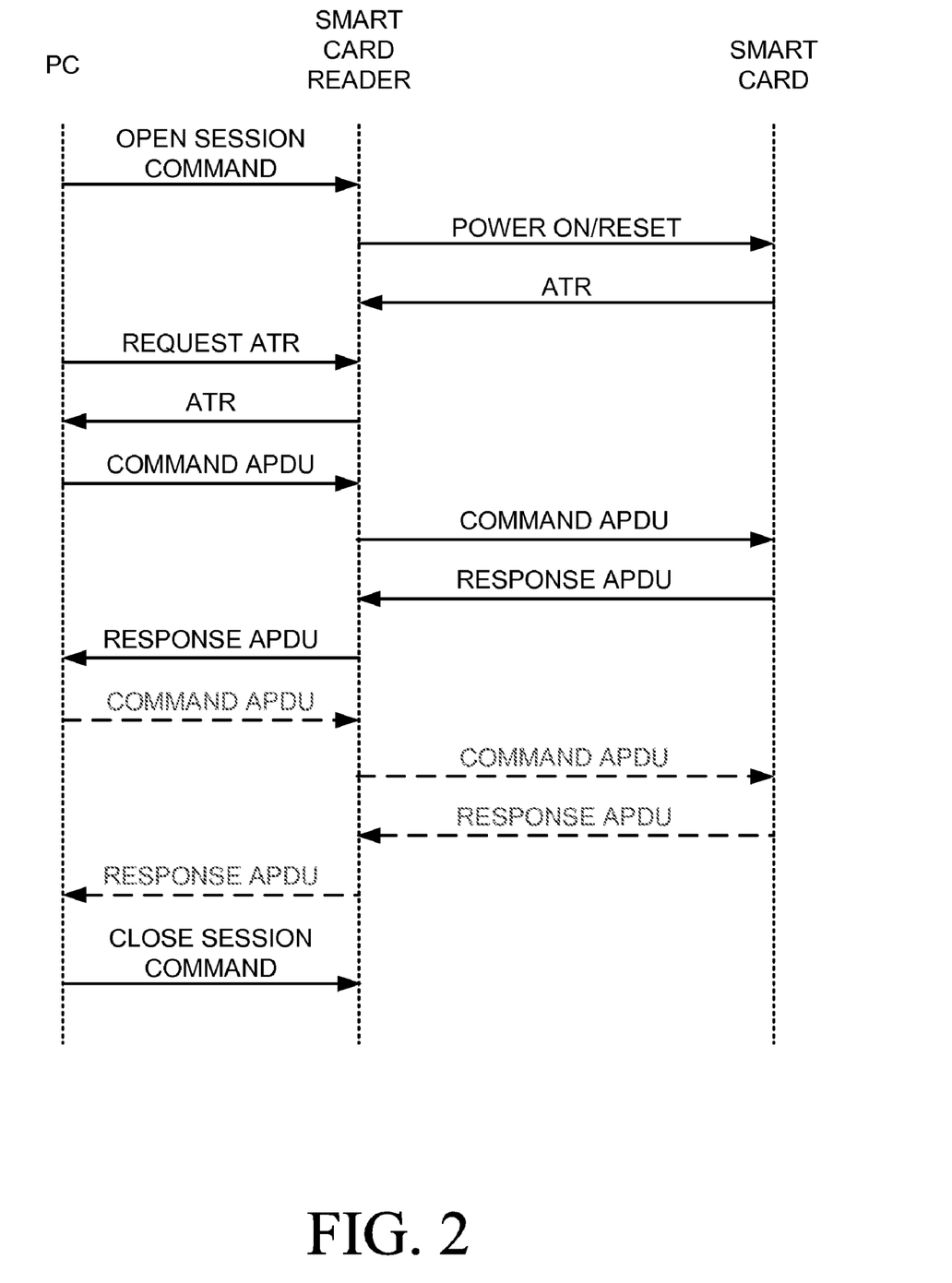
FIG. 2 is a signaling diagram showing an exemplary communication flow between a personal computer, a smart card reader and a smart card.

FIG. 2 is a signaling diagram showing an exemplary communication flow between a PC, a smart card reader and a smart card, according to a method. In this exemplary communication, the ATR is requested by the PC at the start of a communication session with the smart card, and the ATR is sent to the PC by the smart card reader only in response to this request. In this exemplary communication, the PC and the smart card reader already have an open wireless communication session, such as an active Bluetooth® connection. The PC has previously been informed by the smart card reader that a smart card has been inserted. The PC initiates communication with a smart card in the smart card reader by sending an Open Session command to the smart card reader. In response to the Open Session command, the smart card reader powers on the smart card (or resets it if the smart card is already powered on). The smart card sends an ATR to the smart card reader. The smart card reader uses information from the ATR to synchronize communications with the smart card, and caches the ATR. The PC sends a Request for ATR to the smart card reader. This request may be sent immediately after sending the Open Session command, or there may be a delay, as shown in FIG. 2. In response to the request, the smart card reader sends the ATR to the PC. Using the information contained in the ATR, the PC starts communication with the smart card via the smart card reader using Command Application Protocol Data Units (APDUs). The smart card responds using Response APDUs. A series of Command and Response APDUs are communicated until the PC has completed using the smart card. The PC then sends a Close Session command to the smart card reader.

When the communications between the PC and the smart card reader occur via a wireless communication link, requesting the ATR from the smart card reader and returning the ATR to the PC may take longer than is desirable. According to an embodiment of the invention, the ATR is pushed from the smart card reader to the PC prior to any request from the PC for the ATR. This may result in a more efficient process of providing the ATR to the PC. The ATR may be cached in memory on the PC until needed. When the PC needs the ATR information in order to begin a communications session with the smart card, the ATR can be retrieved from the PC itself, avoiding the necessity of communicating at that point with the smart card reader via the wireless link.

Figure 3:
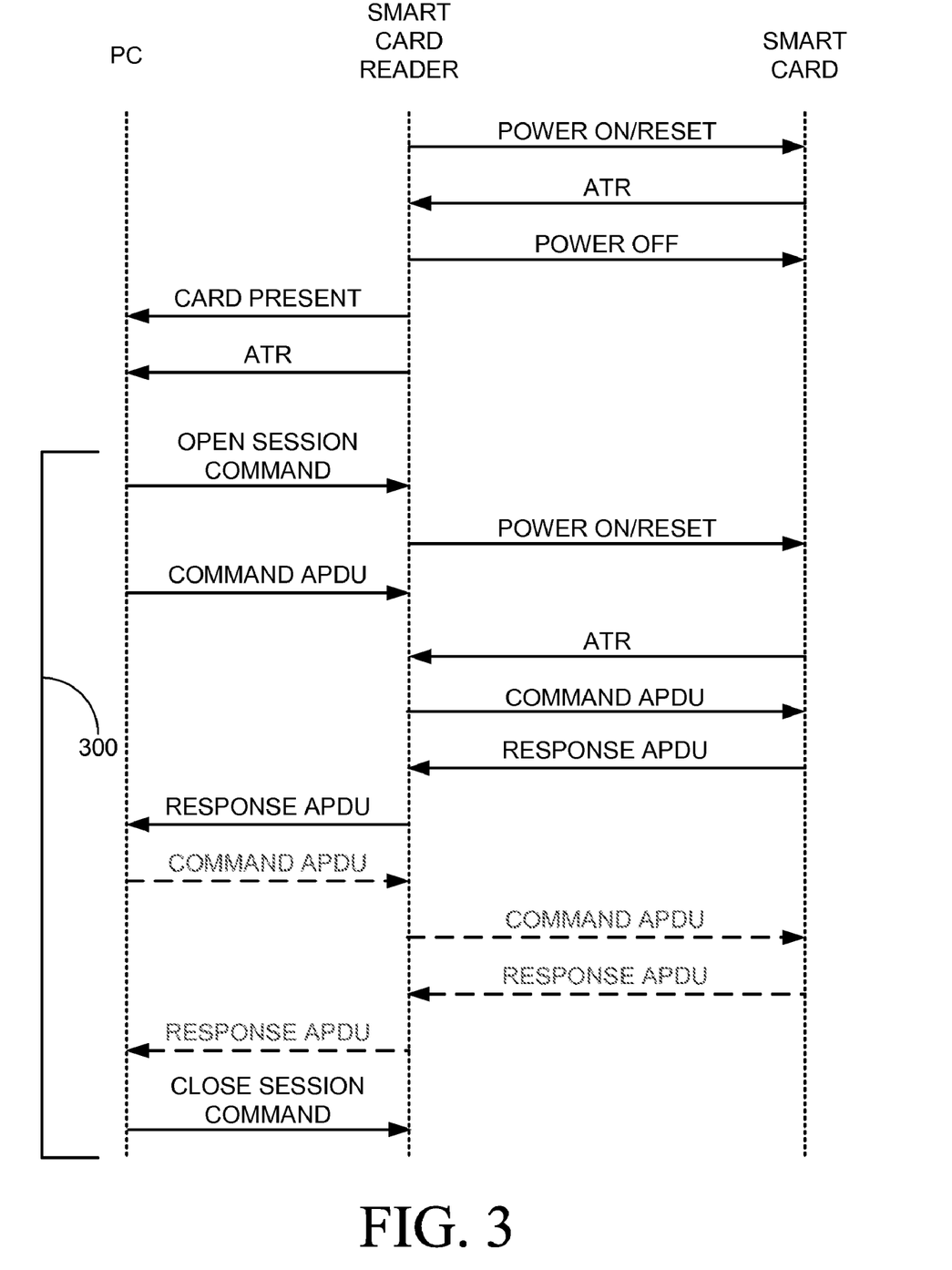
FIG. 3 is a signaling diagram showing an exemplary communication flow between a personal computer, a smart card reader and a smart card, where an ATR is pushed to a computing device from a smart card reader, according to some embodiments of the invention.

FIG. 3 is a signaling diagram showing an exemplary communication flow between a PC, a smart card reader and a smart card, in which the ATR is pushed to the PC before the PC sends an ATR request to the smart card reader. In FIG. 3, the PC and the smart card reader have an open wireless communication session, such as an active Bluetooth® connection. When a smart card is inserted in the smart card reader, the smart card reader powers the smart card on, receives and caches the ATR, and powers off the smart card. It immediately pushes a Card Present identifier along with the ATR to the PC, where the ATR is cached by the smart card reader driver on the PC until the PC requires it for communication with the smart card. The Card Present identifier and the ATR may be sent as a single packet, or as separate packets as shown in FIG. 3. Some time later, the PC sends an Open Session command to the smart card reader to instruct it to open a communications session with the smart card. The PC does not need to request an ATR from the smart card reader at this point, because it may use the cached ATR. The PC may then immediately begin a communications session with the smart card, with the smart card reader as an intermediary. This eliminates the delay experienced by the PC user when the method of FIG. 2 is used, in which the smart card reader waits for a request from the PC to send the ATR. The Open Session command causes the smart card reader to power the smart card on, which results in the smart card sending the ATR to the smart card reader. The initial command APDU may be sent by the PC after that second ATR is received by the smart card reader, or before the second ATR is received as shown in FIG. 3.

Figure 4:
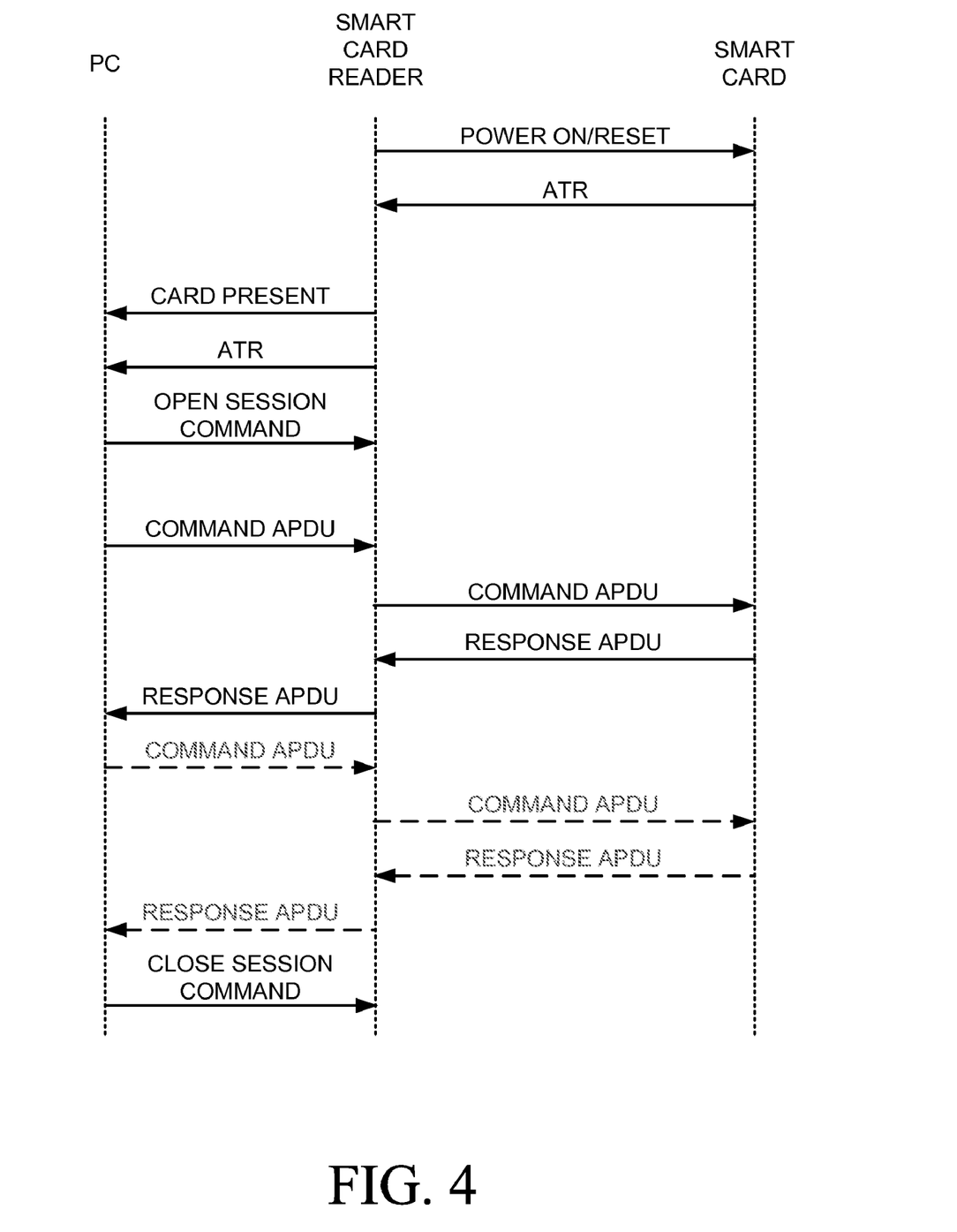
FIG. 4 is a signaling diagram showing another exemplary communication flow between a personal computer, a smart card reader and a smart card, where an ATR is pushed to a computing device from a smart card reader, according to some embodiments of the invention.

The smart card reader may be configured to wait a little while before powering off the smart card after receiving and caching the initial ATR. If the PC sends the Open Session command before a timeout, then the smart card reader does not power off the smart card. In this case, the exemplary communication flow shown in FIG. 3 is modified to that shown in FIG. 4.

Multiple computing devices may connect to a single smart card reader at one time using wireless connections, and each of the devices may require communications with the smart card. The above-described methods may be easily extended to multiple computing devices by pushing the Card Present identifier and ATR to all connected devices at the same time.

The ATR may be pushed at any time when the computing device and the smart card reader have an open wireless connection. Some additional examples follow, in which a wireless connection between the computing device and the smart card reader is not established at the time that the smart card is inserted into the smart card reader.

Figure 5:
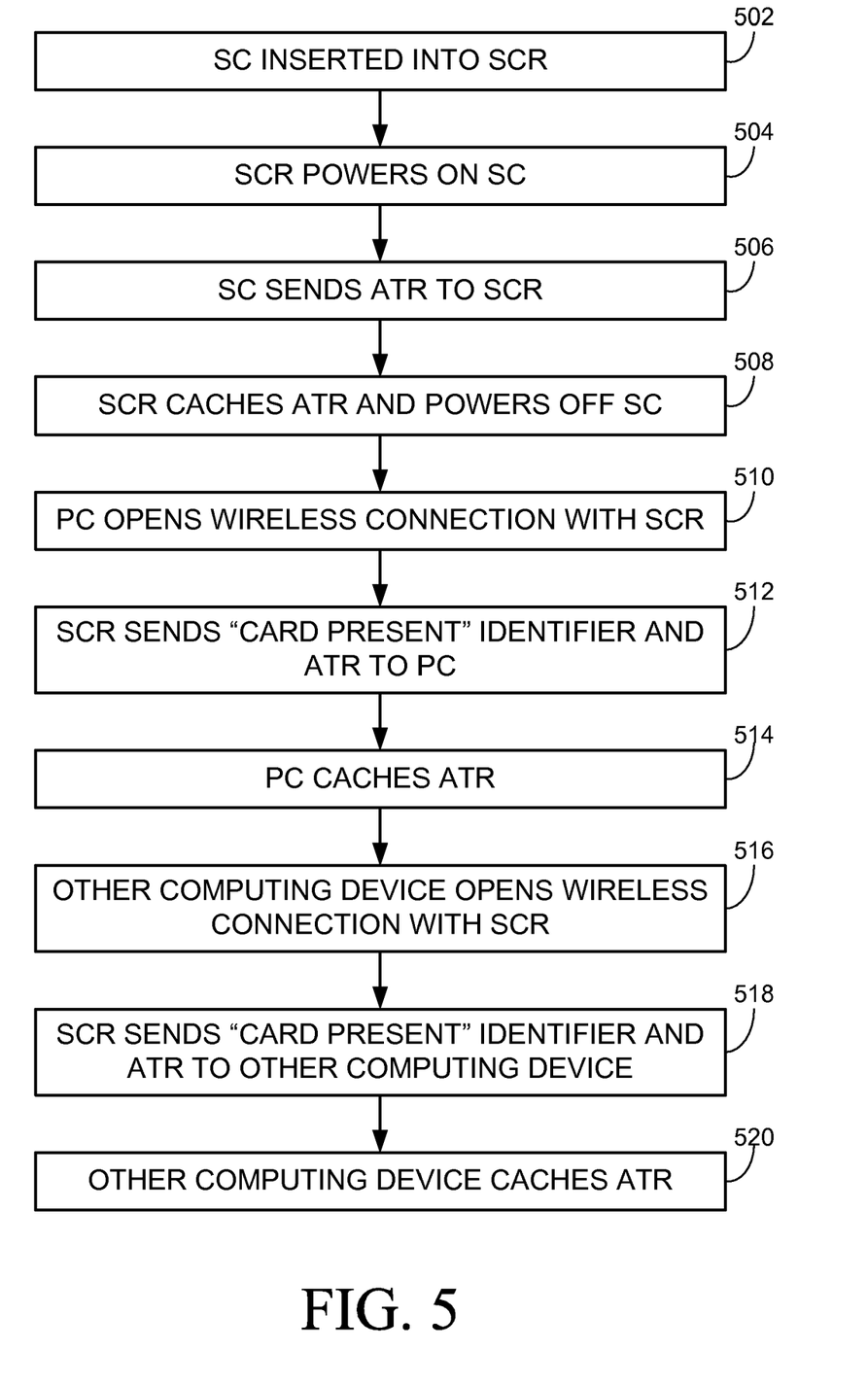
FIG. 5 is a flowchart of an exemplary method for pushing an ATR to a computing device from a smart card reader, according to some embodiments of the invention.

FIG. 5 is a flowchart showing an exemplary method for communicating between a PC, a smart card reader and a smart card, in which the ATR is pushed to the PC by the smart card reader. In this method, a wireless connection between the PC and the SCR has not yet been established. At 502, a smart card is inserted into a smart card reader. At 504, the smart card reader powers the smart card on. At 506, the smart card sends an ATR to the SCR. At 508, the SCR caches the ATR, and powers off the smart card. The ATR remains cached as long as the same smart card remains inserted in the smart card reader. At 510, the PC opens a wireless connection, for example, a Bluetooth® connection, with the smart card reader. At 512, the smart card reader sends the PC a Card Present identifier and pushes the ATR to the PC. These may be sent in separate packets, or in the same packet, or may be contained in a larger packet with additional information necessary for the communications session between the PC and the SCR. At 514, the ATR may be cached on the PC by its smart card reader driver until either the PC requires it for communication with the smart card, or until the smart card is removed, or until the connection is dropped. If the PC then issues an Open Session communication, the communication flow between the PC, smart card reader and smart card may be as shown in a portion 300 of the flow of FIG. 3. In other words, the PC does not need to request an ATR from the smart card reader but rather can commence with sending command APDUs.

When a new computing device opens a connection with the smart card reader at 516, the smart card reader may at 518 push the Card Present identifier and the ATR immediately to the newly connecting device. At 520, the newly connecting device may cache the ATR until it is required for communication with the smart card, or until the smart card is removed, or until the connection is dropped. The method of 516-520 may be repeated as other computing devices connect to the smart card reader. There is no requirement that the first computing device be the PC.

Alternatively, the first computing device to connect to the smart card reader may follow the method of FIG. 2, wherein the ATR is sent from the smart card reader to the computing device only after the computing device sends an ATR request. Additional devices connecting later to the smart card reader may receive the Card Present identifier and the ATR upon connection to the reader, according to the method of 516-520. In this method, the computing devices that connect later to the reader receive the benefit of ATR pushing.

Although the foregoing description of embodiments involves a PC, these embodiments are equally applicable to any wireless-enabled computing device having a smart card reader driver installed thereon, including, for example, wireless-enabled mobile device 106.

Figure 6:
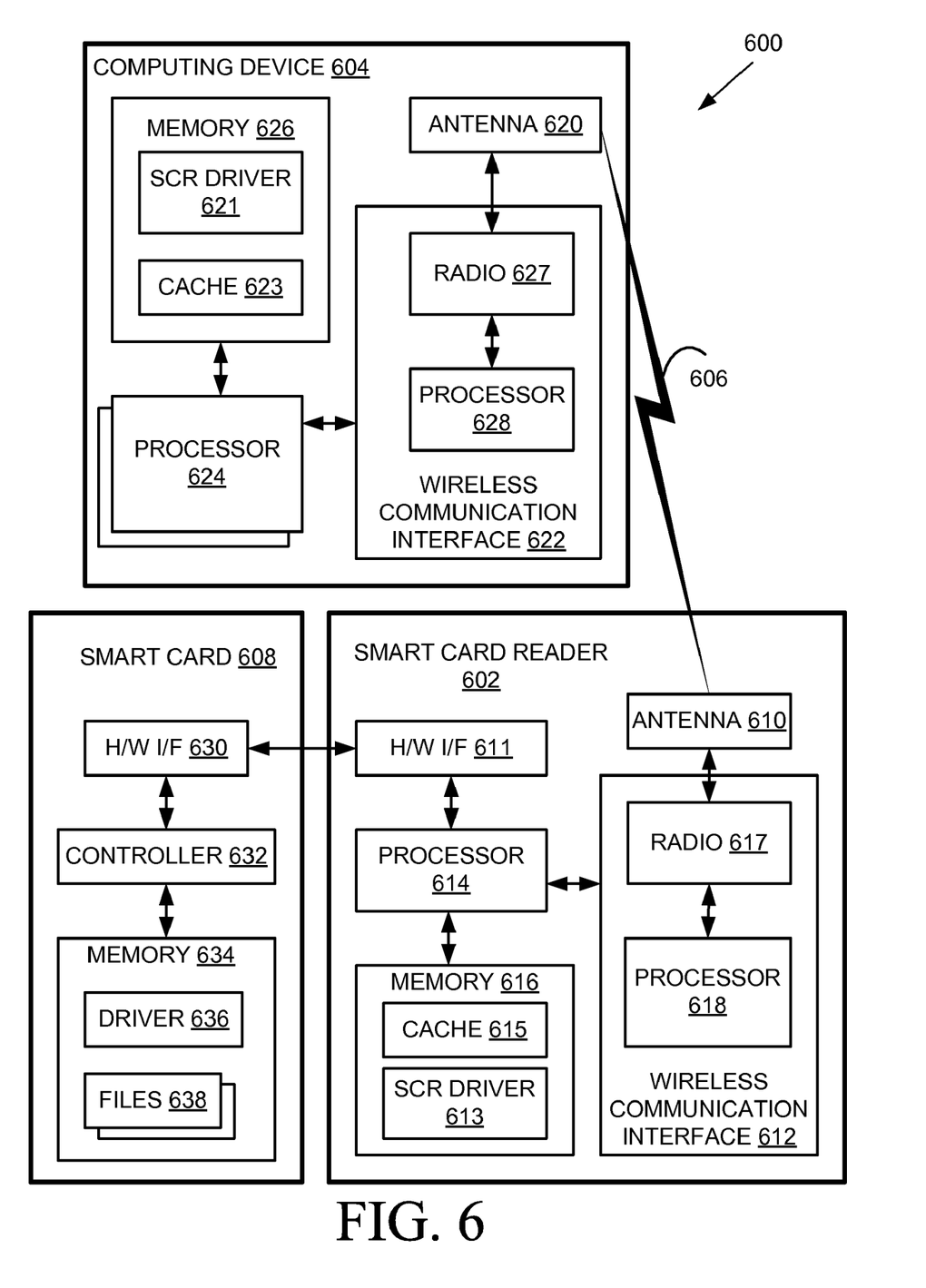
FIG. 6 is a block diagram of an exemplary system involving a computing device, and a smart card reader, according to some embodiments of the invention.

FIG. 6 is a block diagram of an exemplary system 600, according to some embodiments of the invention. System 600 comprises a computing device 604 and a smart card reader 602 able to communicate over a wireless communication link 606, and a smart card 608 in direct communication with smart card reader 602.

A non-exhaustive list of examples for computing device 604 includes any of the following:
a) wireless human interface devices, for example, keyboards, mice, remote controllers, digital pens and the like;
b) wireless audio devices, for example, headsets, loudspeakers, microphones, cordless telephones, handsets, stereo headsets and the like;
c) wireless computerized devices, for example, notebook computers, laptop computers, desktop personal computers, personal digital assistants (PDAs), handheld computers, cellular telephones, MP3 players, printers, facsimile machines, and the like; and
d) wireless communication adapters, for example, universal serial bus (USB) adapters, personal computer memory card international association (PCMCIA) cards, compact flash (CF) cards, mini peripheral component interconnect (PCI) cards, access points, and the like.

Device 604 comprises an antenna 620, a wireless communication interface 622, a processor 624 coupled to wireless communication interface 622, and a memory 626 coupled to processor 624. Memory 626 may be fixed in or removable from computing device 604. Memory 626 may be embedded or partially embedded in processor 624. Memory 626 stores executable code 621 which, when executed by processor 624, functions as a smart card reader driver. Processor 624 and memory 626 may be part of the same integrated circuit or in separate integrated circuits. Wireless communication interface 622 comprises a radio 627 coupled to antenna 620, and a processor 628 coupled to radio 627. Wireless communication interface 622 and processor 624 may be part of the same integrated circuit or in separate integrated circuits.

Similarly, smart card reader 602 comprises an antenna 610, a wireless communication interface 612, a processor 614 coupled to wireless communication interface 612, a hardware interface 611, and a memory 616 coupled to processor 614. For example, hardware interface 611 is a connector. Memory 616 may be fixed in or removable from device 602. Memory 616 may be embedded or partially embedded in processor 614. Memory 616 stores executable code 613 that functions as a smart card reader driver when executed by processor 614. Processor 614 and memory 616 may be part of the same integrated circuit or in separate integrated circuits. Wireless communication interface 612 comprises a radio 617 coupled to antenna 610, and a processor 618 coupled to radio 617. Wireless communication interface 612 and processor 614 may be part of the same integrated circuit or in separate integrated circuits.

A non-exhaustive list of examples for antennae 610 and 620 includes dipole antennae, monopole antennae, multilayer ceramic antennae, planar inverted-F antennae, loop antennae, shot antennae, dual antennae, omnidirectional antennae and any other suitable antennae.

A non-exhaustive list of examples of communication protocols with which communication interfaces 612 and 622 may be compatible includes Bluetooth®, ZigBee™, radio frequency identification (RFID), ultra wideband (UWB), IEEE 802.11, and proprietary communication protocols.

A non-exhaustive list of examples for processors 614, 618, 624 and 628 includes a central processing unit (CPU), a digital signal processor (DSP), a reduced instruction set computer (RISC), a complex instruction set computer (CISC) and the like. Furthermore, processors 614, 618, 624 and 628 may be part of application specific integrated circuits (ASICs) or may be a part of application specific standard products (ASSPs).

A non-exhaustive list of examples for memories 616 and 626 includes any combination of the following:
a) semiconductor devices such as registers, latches, read only memory (ROM), mask ROM, electrically erasable programmable read only memory devices (EEPROM), flash memory devices, non-volatile random access memory devices (NVRAM), synchronous dynamic random access memory (SDRAM) devices, RAMBUS dynamic random access memory (RDRAM) devices, double data rate (DDR) memory devices, static random access memory (SRAM), universal serial bus (USB) removable memory, and the like;
b) optical devices, such as compact disk read only memory (CD ROM), and the like; and
c) magnetic devices, such as a hard disk, a floppy disk, a magnetic tape, and the like.

Smart card 608 comprises a hardware interface 630, a controller 632 coupled to hardware interface 630, and a memory 634 coupled to controller 632. For example, hardware interface 630 comprises contacts. Memory 634 stores executable code 636 which functions as a driver when executed by controller 632. Memory 634 may also store files 638 with stored personal information about the smart card's owner. Memory 634 may also store cryptographic keys and/or secrets from which cryptographic keys can be generated.

Device 604, smart card reader 602 and smart card 608 comprise additional components which are not shown in FIG. 6 and which, for clarity, are not described herein.

Smart card reader driver 621 may communicate with smart card 608 through smart card reader 602 via the wireless communication interface 622. Wireless communication interface 622 is slower than a wired connection such as between hardware interfaces 630 and 611.

When smart card reader 602 receives an ATR from smart card 608, it may cache the ATR in a cache 615 and push the ATR to device 604 through wireless communication link 606. Smart card reader driver 621 may cache the ATR for later use in a cache 623. The ATR may remain cached until either the connection with smart card reader 602 is dropped, or until smart card reader 602 sends information that smart card 608 has been removed.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for communicating an Answer to Reset (ATR) to a computing device by a wireless-enabled smart card reader, the method comprising:
   receiving the ATR at the smart card reader from a smart card; and
   transmitting the ATR from the smart card reader using a wireless communication link to the computing device without waiting for an ATR request from the computing device,
   wherein the ATR is received at the smart card reader following an Open Session command received from another computing device, the method further comprising:
   providing the ATR to the other computing device in response to a request for the ATR; and
   caching the ATR at the smart card reader,
   wherein transmitting the ATR from the smart card reader comprises transmitting the cached ATR from the smart card reader.

2. A computer-readable medium having stored thereon instructions which, when executed by a computing device, result in:
   caching an Answer to Reset (ATR) of a smart card in a cache of the computing device upon receipt of the ATR via a wireless communication link from a wireless-enabled smart card reader; and
   removing the ATR from the cache upon receipt of an indication that the smart card has been removed from the smart card reader.

3. A computer-readable medium having stored thereon instructions which, when executed by a computing device, result in:
   caching an Answer to Reset (ATR) of a smart card in a cache of the computing device upon receipt of the ATR via a wireless communication link from a wireless-enabled smart card reader; and
   removing the ATR from the cache in response to dropping a wireless connection with the smart card reader.

4. A method at a computing device comprising:
   receiving at the computing device an Answer to Reset (ATR) of a smart card via a wireless communication link from a wireless-enabled smart card reader;
   caching the ATR in a cache of the computing device; and
   removing the ATR from the cache of the computing device upon receipt at the computing device of an indication that the smart card has been removed from the smart card reader.

5. A method at a computing device comprising:
   receiving at the computing device an Answer to Reset (ATR) of a smart card via a wireless communication link from a wireless-enabled smart card reader;
   caching the ATR in a cache of the computing device; and
   removing the ATR from the cache of the computing device in response to dropping a wireless connection with the smart card reader.

* * * * *